J. P. CRUTCHER & T. Y. VANCLEAVE.
Improvement in Rein and Shaft Support.
No. 120,861. Patented Nov. 14, 1871.
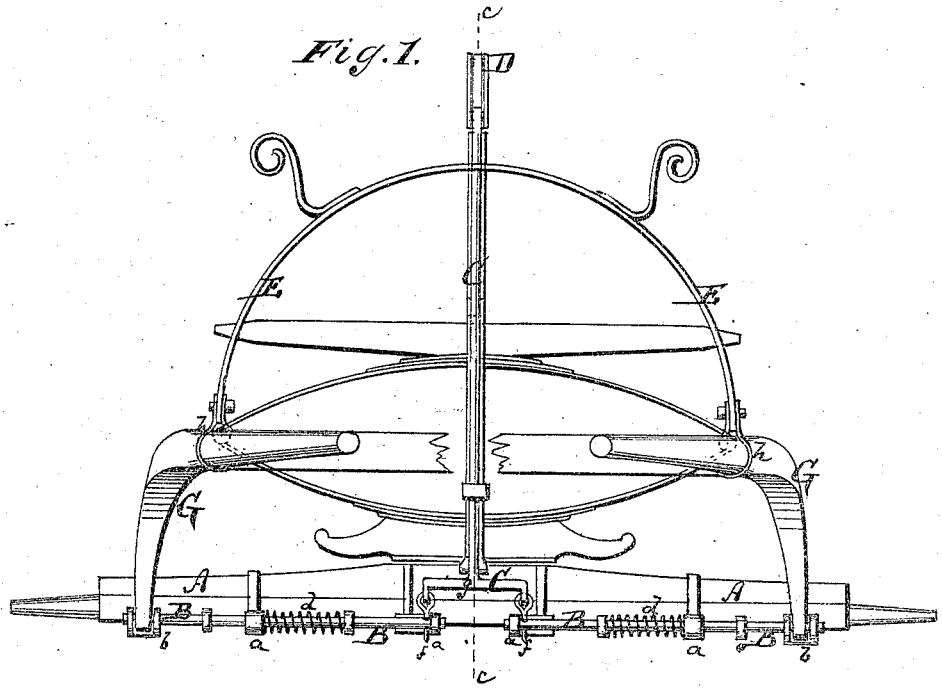
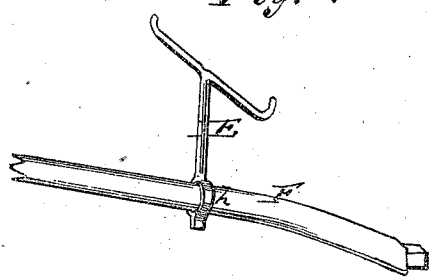

UNITED STATES PATENT OFFICE.

JAMES P. CRUTCHER AND THOMAS Y. VANCLEAVE, OF CORNERSVILLE, TENNESSEE.

IMPROVEMENT IN REIN AND SHAFT SUPPORTS.

Specification forming part of Letters Patent No. 120,861, dated November 14, 1871.

*To all whom it may concern:*

Be it known that we, JAMES P. CRUTCHER and THOMAS Y. VANCLEAVE, of Cornersville, in the county of Marshall and State of Tennessee, have invented a new and useful Improvement in Buggy-Shaft Attachments; and we do hereby declare that the following is a full, clear, and exact description thereof, which will enable others skilled in the art to make and use the same, reference being had to the accompanying drawing forming a part of this specification, in which—

Figure 1 represents a front view of our invention. Fig. 2 is a detail side view of a carriage-pole provided with our line-supporter.

Similar letters of reference indicate corresponding parts.

The invention consists in a new line-supporter applied to buggy-shafts or carriage-poles so that it will also serve to support the rear ends of such shafts or poles, when detached from their vehicles, on the animals' backs and preserve them from injury, all as hereinafter more fully described.

We show in the drawing an apparatus for detaching the shafts or pole of a vehicle, which we design using with the line-supporter. It consists of sliding bolts B passing through ears $a\ a$ of the axle A, the bolts locking the thill-irons to the lugs $b\ b$, and being thrown back by action of the springs $d$ when the pins $f$ are withdrawn through the medium of the rod C $g$ and lever D. E is the arched line-holder fastened to the shafts. It has loops $h\ h$ at the ends, which embrace the shafts and can be clamped thereon by means of screws or bolts in suitable position, permitting the holder to be fastened to any part of the shafts. The holder E will support the reins and prevent them from getting under the horse's tail, also from falling under the feet if accidentally dropped by the driver. If the shafts are disengaged from the vehicle, as above set forth, the arch E will drop upon the horse's back and hold the shaft elevated, preventing it from dragging on the ground. A rein-holder, E, may also be applied to a pole, F, as indicated in Fig. 3, in which case the holder is T-shaped, as shown.

Having thus described our invention, what we claim as new, and desire to secure by Letters Patent, is—

The rein-holder E, applied to the shafts or poles of vehicles and adjustable thereon, substantially as shown and described.

JAMES P. CRUTCHER.
THOMAS Y. VANCLEAVE.

Witnesses:
W. D. McCLURE,
R. M. PILLOW.

(31)